United States Patent
Wang

(10) Patent No.: US 8,452,081 B2
(45) Date of Patent: *May 28, 2013

(54) FORMING 3D MODELS USING MULTIPLE IMAGES

(75) Inventor: Sen Wang, Rchester, NY (US)

(73) Assignee: Eastman Kodak Company, Rochester, NY (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/004,196

(22) Filed: Jan. 11, 2011

(65) Prior Publication Data

US 2012/0177284 A1  Jul. 12, 2012

(51) Int. Cl.
G06K 9/00 (2006.01)
G06K 9/46 (2006.01)

(52) U.S. Cl.
USPC ............................ 382/154; 382/285

(58) Field of Classification Search
USPC ............... 382/154, 190, 254, 289, 296, 305, 382/312, 276; 702/153; 345/647, 648, 649
See application file for complete search history.

(56) References Cited

U.S. PATENT DOCUMENTS

| | | | |
|---|---|---|---|
| 6,075,605 A | 6/2000 | Futamura | |
| 6,549,288 B1 | 4/2003 | Migdal et al. | |
| 7,289,662 B2 * | 10/2007 | Keaton et al. | 382/154 |
| 7,912,673 B2 * | 3/2011 | Hebert et al. | 702/153 |
| 8,140,295 B2 * | 3/2012 | Hebert et al. | 702/153 |
| 8,284,240 B2 * | 10/2012 | Saint-Pierre et al. | 348/47 |
| 2010/0034429 A1 | 2/2010 | Drouin et al. | |
| 2010/0194855 A1 | 8/2010 | Mamiya | |
| 2010/0265316 A1 | 10/2010 | Sali et al. | |

FOREIGN PATENT DOCUMENTS

WO   2010/015086   2/2010

* cited by examiner

*Primary Examiner* — Kanjibhai Patel
(74) *Attorney, Agent, or Firm* — Kevin E. Spaulding

(57) ABSTRACT

A method for determining a three-dimensional model from three or more images comprising: receiving three or more images, each image being captured from a different viewpoint and including a two-dimensional image together with a corresponding range map; designating a plurality of pairs of received images, each pair including a first image and a second image. For each of the designated pairs a geometric transform is determined by identifying a set of corresponding features in the two-dimensional images; removing any extraneous corresponding features to produce a refined set of corresponding features; and determining the geometrical transformation for transforming three-dimensional coordinates for the first image to three-dimensional coordinates for the second image responsive to three-dimensional coordinates for the refined set of corresponding features. A three-dimensional model is determined responsive to the three or more received images and the geometrical transformations for the designated pairs of received images.

14 Claims, 10 Drawing Sheets

FORMING 3D MODELS USING MULTIPLE IMAGES

CROSS-REFERENCE TO RELATED APPLICATIONS

Reference is made to commonly assigned, co-pending U.S. Patent Application Publication No. 2012/0177283, entitled: "Forming 3D models using two range maps", by S. Wang; to commonly assigned, co-pending U.S. Patent Application Publication No. 2012/0176380, entitled: "Forming 3D models using periodic illumination patterns", by S. Wang; and to commonly assigned, co-pending U.S. Patent Application Publication No. 2012/0176478, entitled: "Forming range maps using periodic illumination patterns", by S. Wang, each of which is incorporated herein by reference.

FIELD OF THE INVENTION

This invention pertains to the field of forming three-dimensional computer models, and more particularly to a method for forming three-dimensional computer models from three or more images including corresponding range maps.

BACKGROUND OF THE INVENTION

In recent years, applications involving three-dimensional (3D) computer models of objects or scenes have been becoming increasingly common. For example, 3D models are commonly used to create computer generated imagery for entertainment applications such as motion pictures and computer games. The computer generated imagery may be viewed in a conventional two-dimensional format, or may alternatively be viewed using stereographic imaging systems. 3D models are also used in many medical imaging applications. For example, 3D models of a human body can be produced from images captured using various types of imaging devices such as CT scanners. The formation of 3D models can also be valuable to provide information useful for image understanding applications. The 3D information can be used to aid in operations such as object recognition, object tracking and image segmentation.

There are a number of different methods that have been developed for building a 3D model of a scene or an object. Some methods for forming 3D models of an object or a scene involve capturing a pair of conventional two-dimensional images from two different viewpoints. Corresponding features in the two captured images can be identified and range information (i.e., depth information) can be determined from the disparity between the positions of the corresponding features. Range values for the remaining points can be estimated by interpolating between the ranges for the determined points. A range map is a form of a 3D model which provides a set of z values for an array of (x,y) positions relative to a particular viewpoint. An algorithm of this type is described in the article "Developing 3D viewing model from 2D stereo pair with its occlusion ratio" by Johari et al. (International Journal of Image Processing, Vol. 4, pp. 251-262, 2010).

Other methods for building a 3D model of a scene or an object involve projecting a structured lighting pattern (e.g., a line, a grid or a periodic pattern) onto the surface of an object from a first direction, and then capturing an image of the object from a different direction. For example, see the articles "Model and algorithms for point cloud construction using digital projection patterns" by Peng et al. (ASME Journal of Computing and Information Science in Engineering, Vol. 7, pp. 372-381, 2007) and "Real-time 3D shape measurement with digital stripe projection by Texas Instruments micromirror devices (DMD)" by Frankowski et al. (Proc. SPIE, Vol. 3958, pp. 90-106, 2000). With such approaches, range information can be inferred from distortions in the pattern of the structured lighting due to parallax effects. Typically these methods capture one or more images of an object from a particular viewpoint. Consequently, the resulting 3D model will be incomplete because no information is available regarding the back side of any objects in the captured images. Other variations involve projecting a single vertical line onto an object then rotating the object through a range of angles to construct a 3D model of the object one stripe at a time. While this method can provide a complete 3D model for the object, it has the disadvantage that the object must be of a size and shape that it can be conveniently placed on a rotation stage.

Another method for forming 3D models is known as structure from motion. This method involves capturing a video sequence of a scene from a moving viewpoint. For example, see the article "Shape and motion from image streams under orthography: a factorization method" by Tomasi et al. (Int. J. of Computer Vision, Vol. 9, pp. 137-154, 1992). With structure from motion methods, the 3D positions of image features are determined by analyzing a set of image feature trajectories which track feature position as a function of time. The article "Structure from Motion without Correspondence" by Dellaert et al. (IEEE Computer Society Conference on Computer Vision and Pattern Recognition, 2000) teaches a method for extending the structure in motion approach so that the 3D positions can be determined without the need to identify corresponding features in the sequence of images. Structure from motion methods generally do not provide a high quality 3D model due to the fact that the set of corresponding features that can be identified are typically quite sparse.

Another method for forming 3D models of objects involves the use of "time of flight cameras." Time of flight cameras infer range information based on the time it takes for a beam of reflected light to be returned from an object. One such method is described by Gokturk et al. in the article "A time-of-flight depth sensor—system description, issues, and solutions" (Proc. Computer Vision and Pattern Recognition Workshop, 2004). Range information determined using these methods is generally low in resolution (e.g., 128×128 pixels).

Most techniques for generating 3D models from 2D images produce incomplete 3D models due to the fact that no information is available regarding the back side of any objects in the captured images. Additional 2D images can be captured from additional viewpoints to provide information about portions of the objects that may be occluded from a single viewpoint. However, combining the range information determined from the different viewpoints is a difficult problem.

A variety of 3D imaging techniques have been developed for medical imaging applications such as computed tomography (CT). These methods typically determine an image of a slice through a 3D object. A series of slices can then be combined to construct 3D (volumetric) models of the objects. Such methods require complex and expensive equipment and are not practical for consumer applications.

U.S. Pat. No. 7,551,760 to Scharlack et al., entitled "Registration of 3D imaging of 3D objects," teaches a method to register 3D models of dental structures. The 3D models are formed from two different perspectives using a 3D scanner. The two models are aligned based on the locations of recognition objects having a known geometry (e.g., small spheres having known sizes and positions) that are placed in proximity to the object being scanned.

U.S. Pat. No. 7,801,708 to Unal et al., entitled "Method and apparatus for the rigid and non-rigid registration of 3D shapes," teaches a method for registering two 3D shapes representing ear impression models. The method works by minimizing a function representing an energy between signed distance functions created from the two ear impression models.

U.S. Patent Application Publication 2009/0232355 to Minear et al., entitled "Registration of 3D point cloud data using eigenanalysis," teaches a method for registering multiple frames of 3D point cloud data captured from different perspectives. The method includes a coarse registration step based on finding centroids of blob-like objects in the scene. A fine registration step is used to refine the coarse registration by applying an iterative optimization method.

There remains a need for a simple and robust method for forming 3D models based on two or more images captured from different viewpoints, each image including a two-dimensional image together with a corresponding range map.

SUMMARY OF THE INVENTION

The present invention represents a method for determining a three-dimensional model from three or more images, the method implemented at least in part by a data processing system and comprising the steps of:

a) receiving three or more images, each image being captured from a different viewpoint and including a two-dimensional image together with a corresponding range map;

b) designating a plurality of pairs of received images, each pair including a first image and a second image;

c) for each of the designated pairs of received images:
  i) identifying a set of corresponding features in the two-dimensional images for the first and second digital images;
  ii) removing any extraneous corresponding features in the set of corresponding features responsive to the range maps for the first and second images to produce a refined set of corresponding features;
  iii) determining a geometrical transformation for transforming three-dimensional coordinates for the first image to three-dimensional coordinates for the second image responsive to three-dimensional coordinates for the refined set of corresponding features, the three-dimensional coordinates comprising two-dimensional pixel coordinates from the corresponding two-dimensional image together with a depth coordinate from the corresponding range map;

d) determining a three-dimensional model responsive to the three or more received images and the geometrical transformations for the designated pairs of received images; and e) storing the three-dimensional model in a processor-accessible memory system.

This invention has the advantage that the determination of a set of corresponding points using both 2D and range information enables the determination of geometrical transforms for aligning a set of 3D images in a manner to provide a greater degree of accuracy. Additionally, the process of determining the geometrical transforms for aligning the 3D images converges more quickly and more reliably than methods that use conventional iterative closest points algorithms.

It has the additional advantage that using more than two input images enables the formation of a full 3D model including all sides of an object in the scene.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
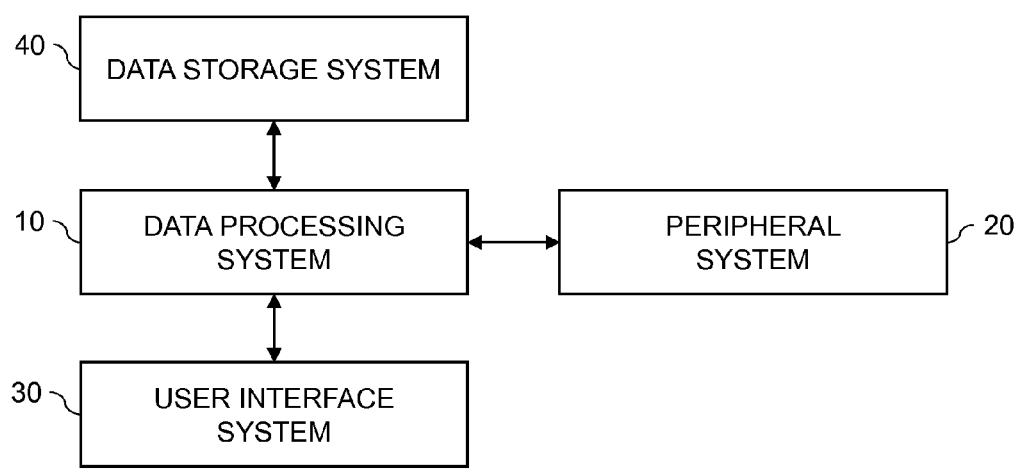
FIG. 1 is a high-level diagram showing the components of a system for determining three-dimensional models.

FIG. 1 is a high-level diagram showing the components of a system for determining three-dimensional models from two images according to an embodiment of the present invention. The system includes a data processing system 10, a peripheral system 20, a user interface system 30, and a data storage system 40. The peripheral system 20, the user interface system 30 and the data storage system 40 are communicatively connected to the data processing system 10.

The data processing system 10 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 40 includes one or more processor-accessible memories configured to store information, including the information needed to execute the processes of the various embodiments of the present invention, including the example processes described herein. The data storage system 40 may be a distributed processor-accessible memory system including multiple processor-accessible memories communicatively connected to the data processing system 10 via a plurality of computers or devices. On the other hand, the data storage system 40 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 40 is shown separately from the data processing system 10, one skilled in the art will appreciate that the data storage system 40 may be stored completely or partially within the data processing system 10. Further in this regard, although the peripheral system 20 and the user interface system 30 are shown separately from the data processing system 10, one skilled in the art will appreciate that one or both of such systems may be stored completely or partially within the data processing system 10.

The peripheral system 20 may include one or more devices configured to provide digital content records to the data processing system 10. For example, the peripheral system 20 may include digital still cameras, digital video cameras, cellular phones, or other data processors. The data processing system 10, upon receipt of digital content records from a device in the peripheral system 20, may store such digital content records in the data storage system 40.

The user interface system 30 may include a mouse, a keyboard, another computer, or any device or combination of devices from which data is input to the data processing system 10. In this regard, although the peripheral system 20 is shown separately from the user interface system 30, the peripheral system 20 may be included as part of the user interface system 30.

The user interface system 30 also may include a display device, a processor-accessible memory, or any device or combination of devices to which data is output by the data processing system 10. In this regard, if the user interface system 30 includes a processor-accessible memory, such memory may be part of the data storage system 40 even though the user interface system 30 and the data storage system 40 are shown separately in FIG. 1.

The present invention will now be described with reference to FIG. 2. A receive first image step 100 is used to receive a first image 102 of a scene. The first image 102 includes a first 2D image 104 captured from a first viewpoint, together with a corresponding first range map 106. In a preferred embodiment, the first 2D image 104 is a color digital image captured using a conventional digital camera. The first range map 106 represents a 2D array of range values corresponding to depth values between a camera location and points in the scene. Preferably, the camera location used to capture the first range map 106 should coincide with the location of the camera used to capture the first 2D image 104.

The first range map 106 can be captured using any method for forming range maps known in the art. In a preferred embodiment, the range map is captured by projecting structured lighting patterns onto the scene and capturing digital images using the same digital camera used to capture the first 2D image 104. The captured digital images can then be analyzed to determine the range map. One such method for determining a range map using a structured lighting arrangement that can be used in accordance with the present invention is described in the article "Real-time 3D model acquisition" by Rusinkiewicz et al. (ACM Transactions on Graphics 21, Vol. 3, pp. 438-446, 2002), which is incorporated herein by reference.

Another method for capturing the first range map 106 that can be used in accordance with the present invention would be to use a dual lens camera to capture a stereo pair of 2D images. The first range map 106 can then be determined by analyzing the stereo pair of 2D images to identify corresponding image points, and then calculating range values based on the relative disparity between the corresponding features. In other embodiments, the first range map 106 can be determined using a time of flight camera method, such as the method described in the aforementioned article by Gokturk et al. entitled "A time-of-flight depth sensor—system description, issues, and solutions."

Similarly, a receive second image step 110 is used to receive a second image 112 of a scene. The second image 112 includes a second 2D image 114 captured from a second viewpoint different from the first viewpoint, together with a corresponding second range map 116. In a preferred embodiment, the second 2D image 114 is a color digital image captured using the same digital camera that was used to capture the first 2D image 104, where the location of the digital camera is moved to a new position to capture the second 2D image 114 from the second viewpoint. Likewise, the second range map 116 is preferably captured from the second viewpoint using the same method that was used to capture the first range map 106.

Figure 3:
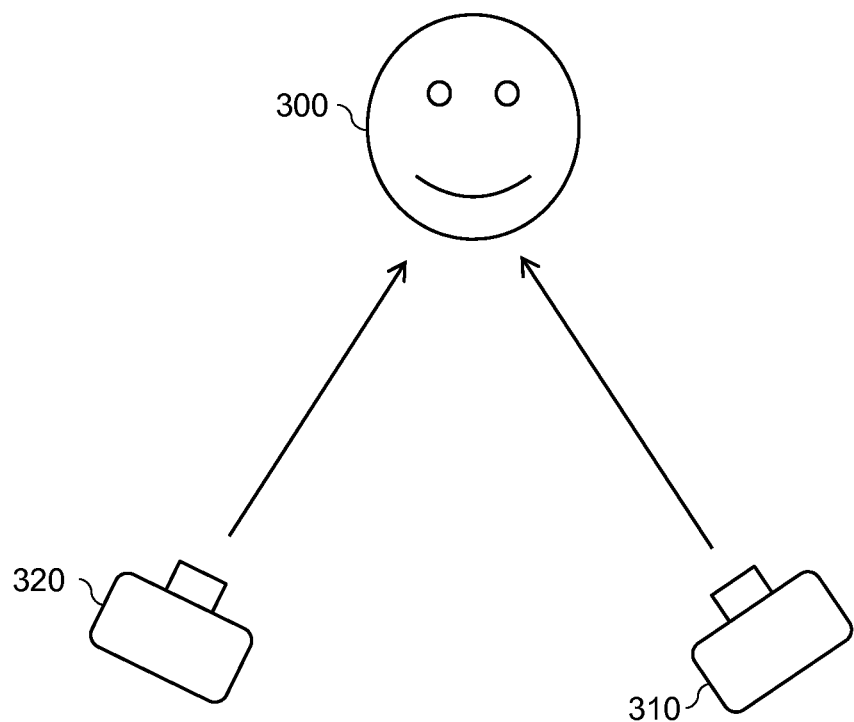
FIG. 3 is a diagram showing an arrangement for capturing images of an object from two viewpoints.

FIG. 3 illustrates an arrangement that can be used to capture the first image 102 and the second image 112. In this arrangement, an object 300 is captured from two different viewpoints. The first image 102 is captured from a first viewpoint 310, and the second image 112 is captured from a second viewpoint 320. In some embodiments the same camera can be used to capture both the first image 102 and the second image 112 by repositioning the camera between shots. This has the disadvantage that the two images cannot be captured simultaneously. Therefore, this approach will only work for stationary scenes. In a preferred embodiment, two identical cameras can be positioned at the first viewpoint 310 and the second viewpoint 320 so that the two images can be captured simultaneously.

Figure 4:
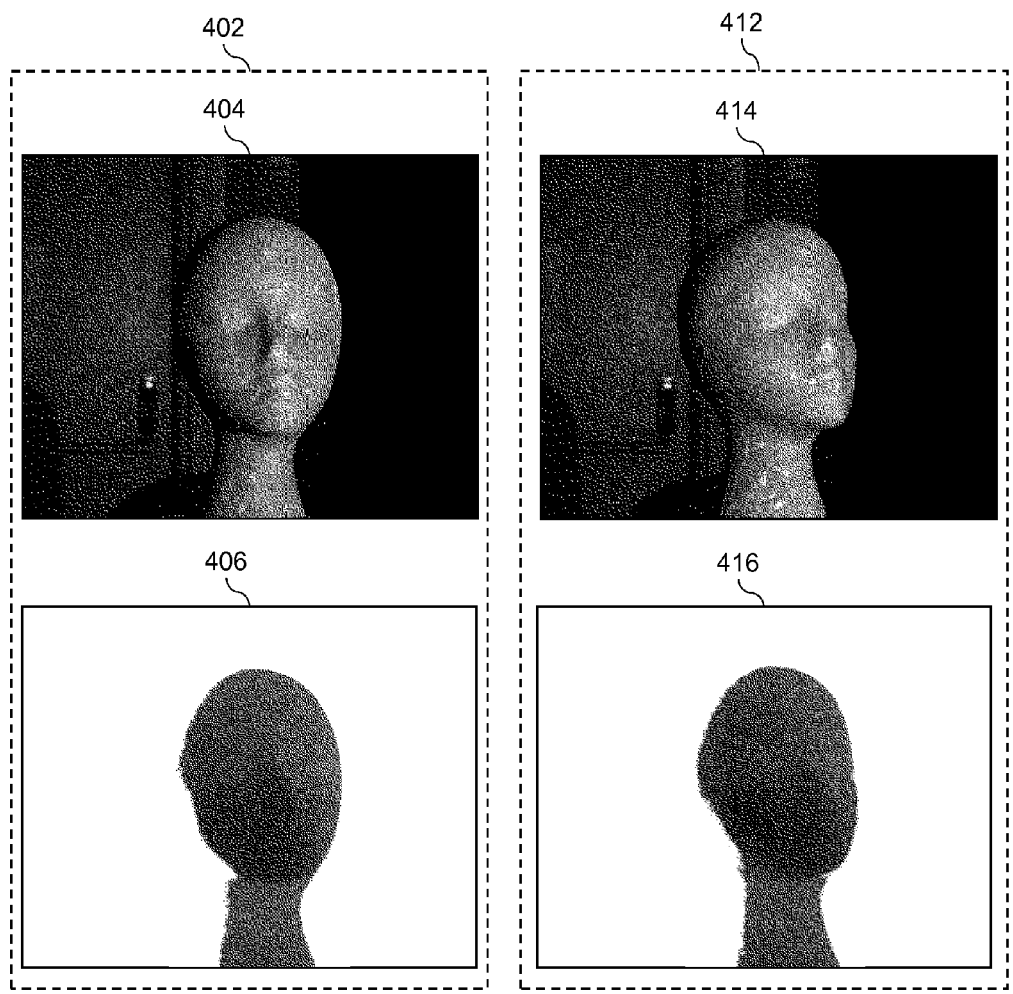
FIG. 4 shows an example pair of images, each including a two-dimensional image and a corresponding range map.

FIG. 4 shows an example of a first 2D image 404 captured from a first viewpoint, and a second 2D image 414 captured from a second viewpoint located to the left of the first viewpoint. A first range map 406 is also shown that corresponds to the first 2D image 404. The range map 406 is encoded such that close distances are shown as dark tone values and far distances are shown as light tone values. Distances larger than 2000 mm are encoded as white (code value 255). Likewise, a second range map 416 is shown that corresponds to the second 2D image 414. Taken together, the first 2D image 404 and the first range map 406 comprise a first image 402. Similarly, the second 2D image 414 and the second range map 416 comprise a second image 412.

Figure 2:
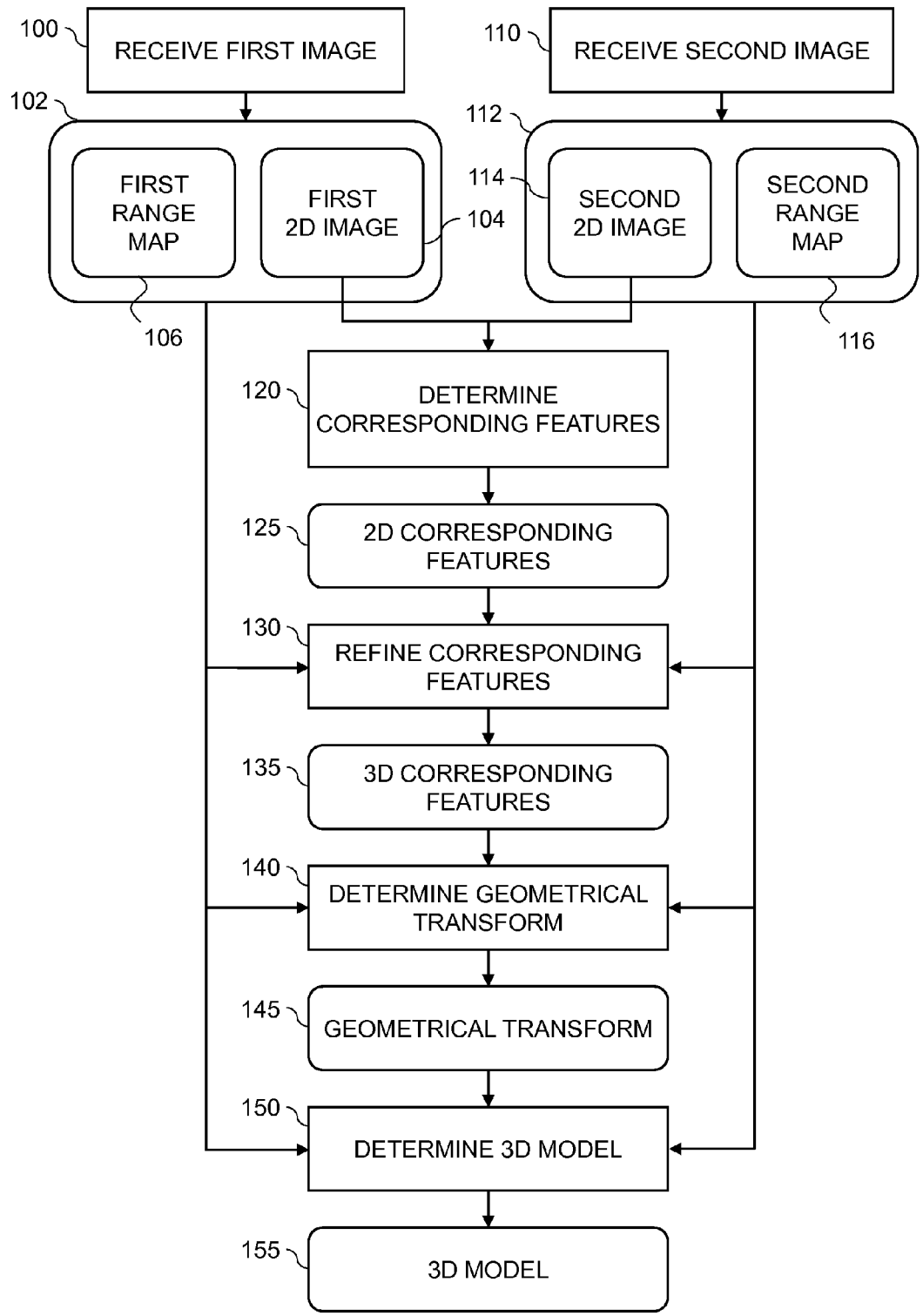
FIG. 2 is flow chart of a method for determining a three-dimensional model from two input images.

Returning to a discussion of FIG. 2, a determine corresponding features step 120 is used to analyze the first 2D image 104 and the second 2D image 114 to determine a set of 2D corresponding features 125. The 2D corresponding features are comprised of X-Y coordinates for a set of corresponding features. Table 1 illustrates a set of K corresponding features from a first 2D image 104 captured from a right viewpoint and a second 2D image 114 captured from a left viewpoint.

TABLE 1

2D corresponding features from first and second 2D images.

| Point # | Right Image Coordinate | | Left Image Coordinate | |
|---|---|---|---|---|
| 1 | $X_{R1}$ | $Y_{R1}$ | $X_{L1}$ | $Y_{L1}$ |
| 2 | $X_{R2}$ | $Y_{R2}$ | $X_{L2}$ | $Y_{L2}$ |
| ... | ... | ... | ... | ... |
| K | $X_{RK}$ | $Y_{RK}$ | $X_{LK}$ | $Y_{LK}$ |

The 2D corresponding features 125 can be determined using any method known in the art for determining corresponding features in a pair of images. In a preferred embodiment, the well-known SIFT features algorithm is used to determine the 2D corresponding features 125. The SIFT features algorithms works by identified corresponding sets of corner points in a pair of images. One such method for finding corresponding image points that can be used in accordance with the present invention, is that described in the article "Object recognition from local scale-invariant features," by Lowe (Proceedings of the International Conference on Computer Vision, Vol. 2. pp. 1150-1157, 1999), which is incorporated herein by reference. Some versions of the SIFT features algorithm identify corresponding points by evaluating both spatial and color features in the pair of images. An algorithm of this type is described by Abdel-Hakim et al. in the article "CSIFT: A SIFT Descriptor with Color Invariant Characteristics" (Proc. IEEE Conf. of Computer Vision and Pattern Recognition, pp. 1978-1983, 2006).

In other embodiments, the well-known SURF features algorithm is used to determine the 2D corresponding features 125. The SURF features algorithm is described in the article by Bay et al. entitled "SURF: Speeded Up Robust Features," (Computer Vision and Image Understanding, Vol. 110, pp. 346-359, 2008). The SURF features algorithms works by identified corresponding sets of corner points and edge points in a pair of images.

Figure 5:
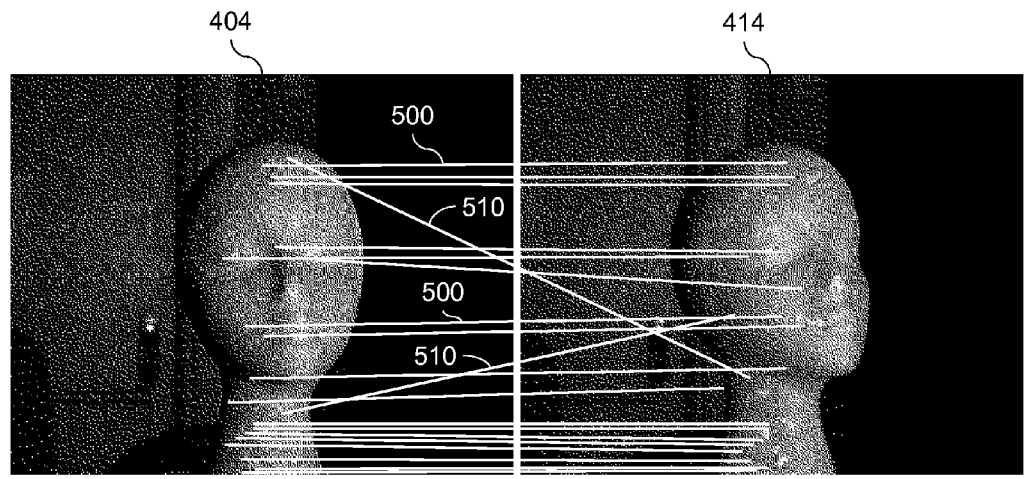
FIG. 5 shows a set of corresponding features determined for a pair of two-dimensional images.

FIG. 5 shows a set of corresponding features 500 that were identified in the first 2D image 404 and the second 2D image 414 that were shown in FIG. 4. The corresponding features 500 were determined using the SIFT-based technique that was described above. It can be seen that the corresponding features 500 include several extraneous corresponding features 510, where the determine corresponding features step 120 mistakenly associated two points that do not correspond to each other. The set of corresponding features 500, including the extraneous corresponding features 510, comprise the set of 2D corresponding features 125 in FIG. 2.

Returning to a discussion of FIG. 2, a refine corresponding features step 130 is used to identify and eliminate any extraneous corresponding features in the set of 2D corresponding features 125, producing a set of 3D corresponding features 135. In a preferred embodiment, the refine corresponding features step 130 identifies the extraneous corresponding features by using range information from the first range map 106 and the second range map 116 to compare the surface topologies in the regions around the corresponding features. To accomplish this, the depth information in the first range map 106 in a neighborhood around a particular point in the first image 102 can be compared with the depth information in the second range map 116 around the corresponding point in the second image 112. Inconsistencies in the topologies of the regions around the corresponding features is an indication that they were erroneously identified.

In a preferred embodiment, "spin image" representations are determined for each of the corresponding features using the method described in the article by Johnson entitled "Using spin images for efficient object recognition in cluttered 3D scenes" (IEEE Transactions on Pattern Analysis and Machine Intelligence, Vol. 21, pp. 443-449, 1999). The spin images are comprised of a 2D array of surface statistics describing the shape of a surface in a local neighborhood. To determine whether the corresponding features are extraneous, a similarity metric is computed corresponding to the square root of the sum of the squared differences between corresponding coefficients in the spin image arrays. If the similarly metric exceeds a specified threshold, it can be assumed that the corresponding features were erroneously identified and they are eliminated from the set of 2D corresponding features 125.

Figure 6:
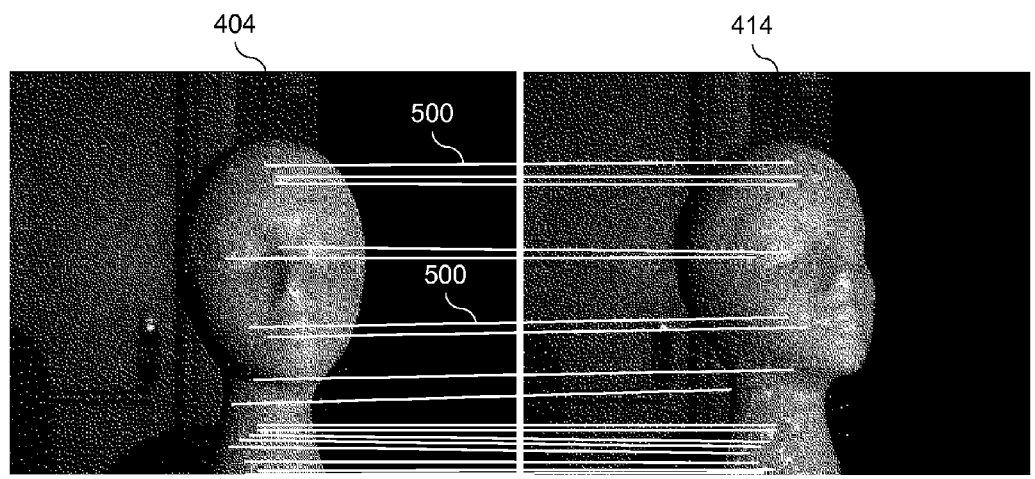
FIG. 6 shows a refined set of corresponding features determined for a pair of two-dimensional images.

FIG. 6 shows a refined set of corresponding features for the first 2D image 404 and the second 2D image 414 that were shown in FIG. 5, where the extraneous corresponding features 510 have been eliminated, leaving only the valid corresponding features 500.

Once the extraneous corresponding features have been eliminated, the set of 3D corresponding features 135 is formed by combining the XY coordinates of the corresponding features in the 2D image with the corresponding range value from the range map, producing a set of XYZ coordinates for each point the corresponding features.

In determine geometrical transform step 140, a geometrical transform 145 is determined that can be used to transform the three-dimensional coordinates of the first received image (e.g., the right image) to the three-dimensional coordinates for the second received image (e.g., the left image) responsive to the refined set of 3D corresponding features 135. In a preferred embodiment, the geometrical transform 145 is a transformation matrix, T, which can be used to transform 3D coordinates for features in the first image 102 into 3D coordinates for corresponding features in the second image 112:

$$\begin{bmatrix} X_L \\ Y_L \\ Z_L \\ 1 \end{bmatrix} = T \cdot \begin{bmatrix} X_R \\ Y_R \\ Z_R \\ 1 \end{bmatrix} \qquad (1)$$

where $(X_R, Y_R, Z_R)$ are the XYZ coordinates for a point in the first image 102, $(X_L, Y_L, Z_L)$ are the XYZ coordinates for the corresponding feature in the second image 112, and T is a 4×4 transformation matrix of the form:

$$T = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} \qquad (2)$$

For this example, it will be assumed that the first image 102 is captured from a right viewpoint as indicated by the "R" subscript, and the second image 112 is captured from a left viewpoint as indicated by the "L" subscript, but this orientation choice is arbitrary. It will be recognized by one skilled in the art that a transformation matrix of this form can be used to perform rotation, translation and scaling operations, or combinations thereof, depending on the matrix coefficients.

The determine geometrical transform step 140 can be performed using any method known in the art. Examples of methods for determining geometrical transforms that can be used to register 3D shapes can be found in the follow references. The article "A method for registration of 3-D shapes," by Besl et al. (IEEE Transactions on Pattern Analysis and Machine Intelligence, Vol. 14, pp. 239-256, 1992) teaches a registration method based on an iterative closest points (ICP) algorithm. The article "Registering multiview range data to create 3D computer objects" by Blais et al. (IEEE Transactions on Pattern Analysis and Machine Intelligence, Vol. 17, pp. 820-824, 1995) teaches a function that measures the quality of alignment between partial surfaces contained in two range maps based on Euclidean distances between a set of control points. The article "RANSAC-based DARCES: A new approach to fast automatic registration of partially overlapping range images," by Chen et al. (IEEE Transactions on Pattern Analysis and Machine Intelligence, Vol. 21, pp. 1229-1234, 1999) treats 3D registration as a partial-matching problem and uses a rigidity constraint to restrict the search range used for matching. The article "Efficient Variants of the ICP Algorithm" by Rusinkiewicz et al. (Proc. Third Intl. Conf. on 3D Digital Imaging and Modeling, pp. 145-152, 2001) describes computationally efficient variations of the iterative closest points (ICP) algorithm.

Figure 7:
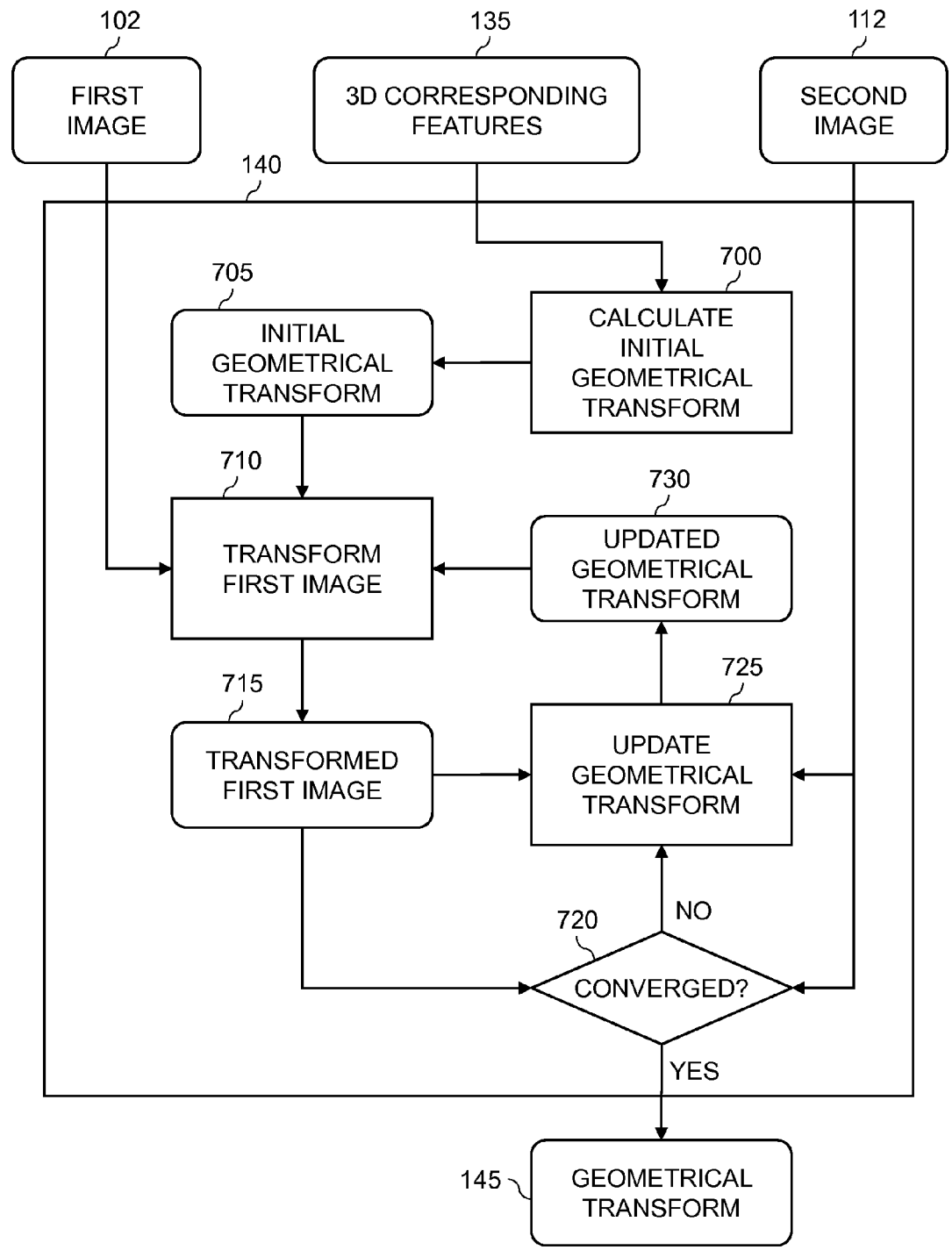
FIG. 7 shows a flow chart of a method for determining a geometrical transform according to an embodiment of the present invention.

In a preferred embodiment, the determine geometrical transform step 140 is performed using the method shown in the flow chart of FIG. 7, which is based on an iterative closest points (ICP) algorithm. A calculate initial geometrical transform step 700 is used to calculate an initial geometrical transform 705 responsive to the set of 3D corresponding features 135. This step can be performed by solving the following matrix equation using any method known in the art:

$$L = T \cdot R \qquad (3)$$

where L and R are matrices of XYZ coordinates for the set of 3D corresponding features 135 from the left and right images, respectively:

$$L = \begin{bmatrix} X_{L1} & X_{L2} & \ldots & X_{LK} \\ Y_{L1} & Y_{L2} & \ldots & Y_{LK} \\ Z_{L1} & Z_{L2} & \ldots & Z_{LK} \\ 1 & 1 & \ldots & 1 \end{bmatrix} \qquad (4)$$

$$R = \begin{bmatrix} X_{R1} & X_{R2} & \ldots & X_{RK} \\ Y_{R1} & Y_{R2} & \ldots & Y_{RK} \\ Z_{R1} & Z_{R2} & \ldots & Z_{RK} \\ 1 & 1 & \ldots & 1 \end{bmatrix} \qquad (5)$$

where each column of the L and R matrices are the XYZ coordinates for a different corresponding feature in the set 3D corresponding features 135, $(X_{Li}, Y_{Li}, Z_{Li})$ and $(X_{Ri}, Y_{Ri}, Z_{Ri})$ being the XYZ coordinates for the $i^{th}$ 3D corresponding feature from the left and right images, respectively, and K being the number of 3D corresponding features.

Preferably, the transformation matrix T for the initial geometrical transform 705 is determined using a least squares regression method based on the set of 3D corresponding features 135. Those skilled in the art will recognize that one method for determining a least squares solution to Eq. (3) is to perform the following matrix calculations:

$$T = (L \cdot R^T) \cdot (R \cdot R^T)^{-1} \qquad (6)$$

where $R^T$ is the transpose of the R matrix, and $(\bullet)^{-1}$ indicates a matrix inverse operation.

Each pixel in the first image 102 and the second image 112 can be viewed as a set of points (i.e., pixels) having XYZ coordinates, wherein the XY coordinates of a particular point correspond to the pixel location in the 2D image, and the Z coordinate is the range value from the corresponding pixel location in the range map. A transform first image step 710 is used to transform the XYZ coordinates for each point in the first image 102 using the initial geometrical transform 705 to form a transformed first image 715. In equation form this can be represented as:

$$I_{RT} = T \cdot I_R \qquad (7)$$

where $I_R$ and $I_{RT}$ are matrices of XYZ coordinates for the first image 102 and the transformed first image 715, respectively.

While the points in the transformed first image 715 should be closely aligned with the corresponding features in the second image 112, there will generally be some small misalignments due to any inaccuracies in the initial geometric transform 705. A convergence test 720 is used to evaluate the misalignments between the transformed first image 715 and the second image 112 to determine if the match is adequate according to a specified convergence criterion. This can be done by computing an error metric such as the RMS depth difference between corresponding points in the two images. It should be noted that there may be points in the transformed first image 715 that fall outside the boundary of the second image 112; these points should be excluded from the error metric calculation. Likewise, there may be points in the second image 112 that fall outside the boundary of the transformed first image 715; these points should be also excluded from the error metric calculation. There may also be points in one of the images corresponding to points that were occluded in the other image. If such points can be identified, they should also be excluded from the error metric calculation. In a preferred embodiment, the convergence test 720 compares the determined error metric to a specified threshold value. If the error metric is less than the threshold value, the current geometrical transform is deemed to be acceptable and is provided as the geometrical transform 145.

If the determined error metric exceeds the specified threshold value, the convergence test 720 can deem the process of determining the geometrical transform to be not converged. In this case, an update geometrical transform step 725 is used to determine an updated geometrical transform 730. This can be done by solving the following matrix equation for an incremental geometrical transform $T_i$:

$$I_L = T_i I_{RT} \qquad (8)$$

where $I_L$ is a matrix of XYZ coordinates for points in the second image 112, and $I_{RT}$ is a matrix of XYZ coordinates for the closest point in the transformed first image 715. As with the error metric discussed earlier, any points in one of the images that do not have a corresponding point in the other image should not be included in the $I_L$ and $I_{RT}$ matrices. One method that such points can be identified is where the closest point exceeds a predefined threshold distance. In some embodiments, Eq. (8) can be solved for the incremental geometrical transform $T_i$ using the same matrix solution method that was shown in Eq. (6).

Once the incremental transform $T_i$ has been determined, the updated geometrical transform 730 (T') can be determined by cascading the incremental geometrical transform $T_i$ with the previous geometrical transform T:

$$T' = T_i \cdot T \qquad (9)$$

The transform first image step 710 is then used to calculate a new transformed first image 715 using the updated geometrical transform 730. The convergence test 720 is then used to compare the new transformed first image 715 to the second image 112 to determine whether the convergence criterion has been satisfied.

In some embodiments, additional (or different) convergence criteria can be specified as is well-known in the optimization field. For example, even if the error metric is greater than the specified threshold value, the process of determining the geometrical transform can be deemed to be converged if the error metric improves by less than a specified increment between successive iterations, or if a maximum number of iterations has been reached.

Returning to a discussion of FIG. 2, once the geometrical transform 145 has been determined, a determine 3D model step 150 is used to determine a unified 3D model 155 responsive to the first image 102, the second image 112 and the geometrical transform 145. According to a preferred embodiment, this is accomplished by using the geometrical transform 145 to transform three-dimensional coordinates for one of the input images such that they are consistent with the three-dimensional coordinates of the other image. In the above example, Eq. (7) can be used to transform the XYZ coordinates for the first image 102 ($I_R$) using the geometrical transform 145 (T) to determine XYZ coordinates for the transformed first image ($I_{RT}$). As mentioned earlier, the XYZ coordinates for the first image 102 ($I_R$) can be determined by combining the XY coordinates of a particular pixel location in the first 2D image 104, with the Z coordinate from the corresponding pixel location in the first range map 106.

Figure 8:
FIG. 8 shows an example of a three-dimensional model determined using two input images.

The XYZ coordinates for the transformed first image ($I_{RT}$) will now be compatible with the XYZ coordinates for the second image 112 ($I_L$). The 3D model 155 can then be determined by combining the two sets of XYZ coordinates. Each of the sets of XYZ coordinates ($I_{RT}$ and $I_L$) represents a "point cloud" of individual 3D points corresponding to the pixels in the captured images, where each point in the point cloud is assigned a spatial coordinate given by the XYZ coordinates and a color value corresponding to the color of the corresponding pixel in the input 2D image (e.g., the RGB color values). In some embodiments, the 3D model 155 is formed by simply combining all of the individual 3D points in the first and second point clouds to form a combined point cloud. An example of a point cloud 3D model 750 comprising a combined point cloud is shown in FIG. 8, determined from the first image 402 and the second image 412 shown in FIG. 4.

Figure 9:
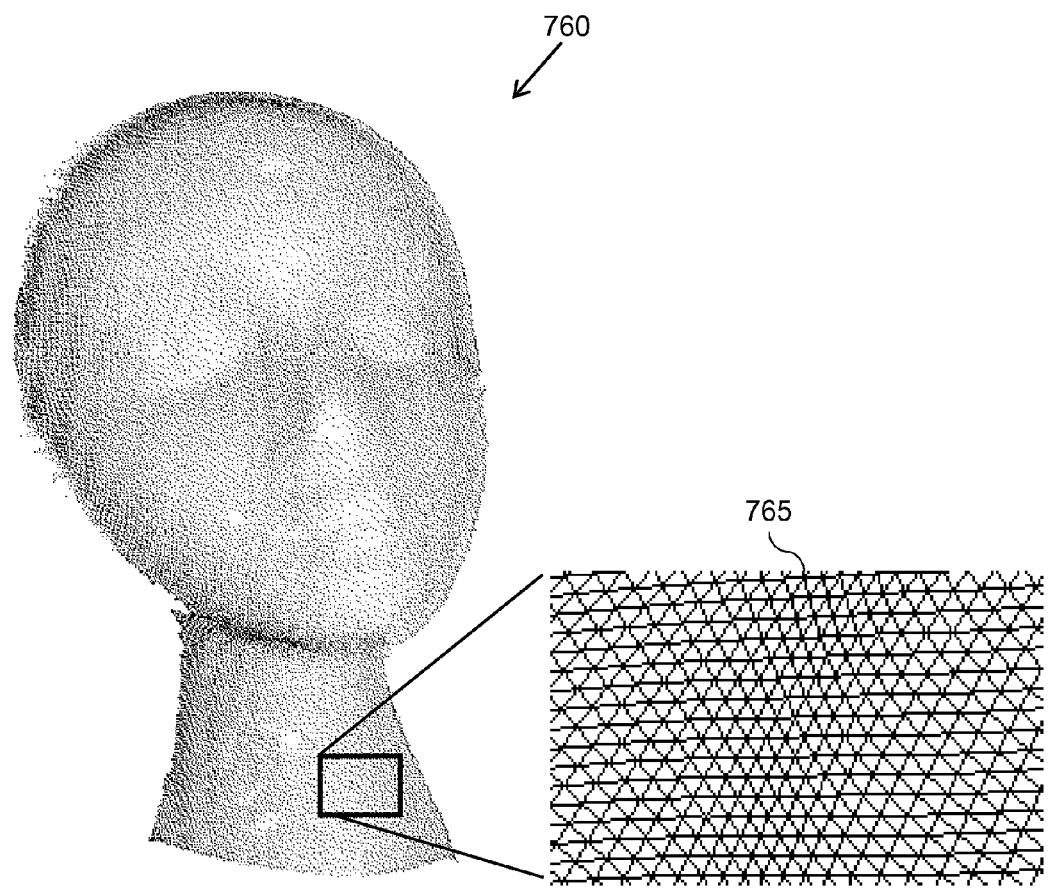
FIG. 9 shows an example of a three-dimensional wireframe model corresponding to the three-dimensional model of FIG. 8.

In other embodiments, the combined point cloud can be processed to reduce noise and to produce other forms of 3D models. For example, many applications for 3D models use 3D models that are in the form of a triangulated mesh of points. Methods for forming such triangulated 3D models are well-known in the art. In some embodiments, the point cloud is resampled to remove redundancy and smooth out noise in the XYZ coordinates. A set of triangles are then formed connecting the resampled points using a method such as the well-known Delaunay triangulation algorithm. FIG. 9 shows a triangulated 3D model 760 formed from the point cloud 3D model 750 in FIG. 8. The inset 765 shows a magnified region of the triangulated 3D model 760 where it can be seen that the triangulated 3D model is comprised of a mesh of points that are connected using triangular facets. Additional processing steps can be used to perform mesh repair in regions where there are holes in the mesh or to perform other operations such as smoothing.

Once the 3D model 155 has been formed, it will generally be stored in a processor-accessible memory system for use in various applications. The processor-accessible memory system can take many different forms including those described with reference to the data storage system 40 in FIG. 1. The stored 3D model 155 is useful for applications such as computer animation, 3D object recognition, and for producing stereoscopic images for entertainment and gaming purposes.

Figure 10:
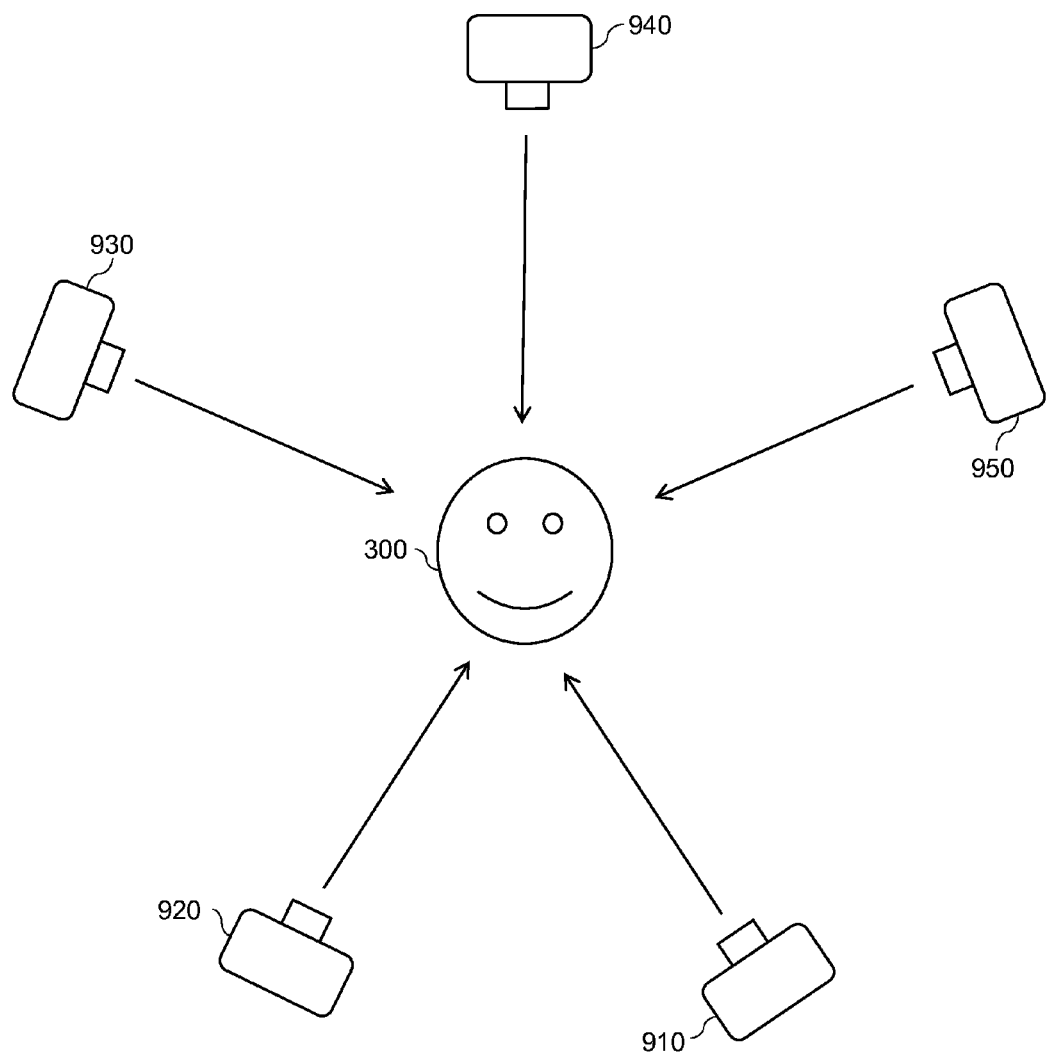
FIG. 10 is a diagram showing an arrangement for capturing images of an object from five viewpoints.

3D models formed using two input images will typically not provide complete 3D representations of the objects in the scene due to the fact that there will generally be portions of the objects that are occluded in both input images. To form a complete representation of the objects, it is generally necessary to capture images from additional viewpoints. The above described method can be generalized to the case where there are more than two input images captured from different viewpoints. For example, FIG. 10 shows an arrangement where images of an object 300 are captured from five different viewpoints 910, 920, 930, 940 and 950, each of the captured images including both a 2D image and a range map.

Figure 11:
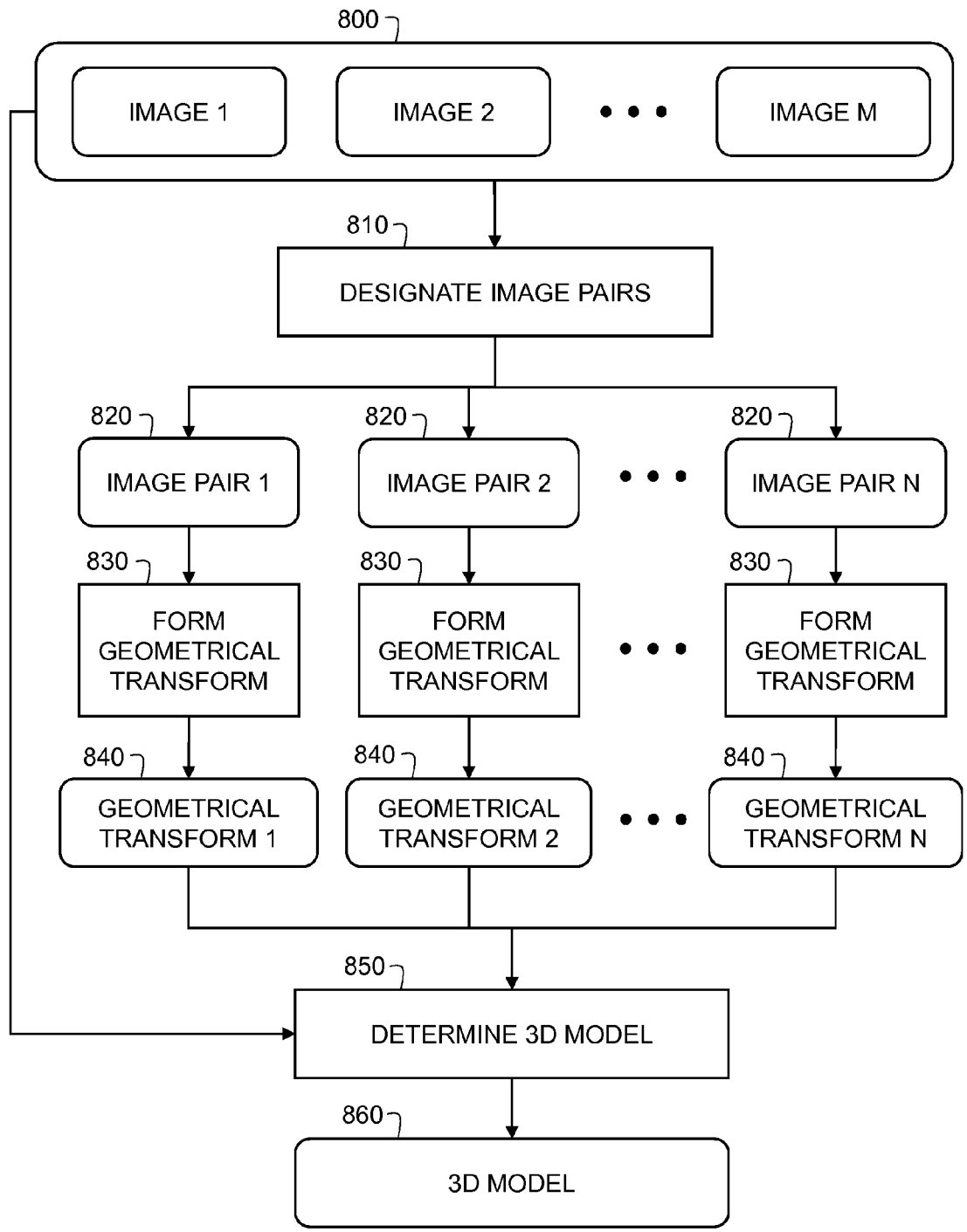
FIG. 11 is a flow chart of a method for determining a three-dimensional model from three or more input images.

FIG. 11 shows a flow chart for a method of determining a 3D model from a set of three or more images, each image captured from a different viewpoint. A set of images 800 comprises M images captured from M different viewpoints, each including both a 2D image and a range map. A designate image pairs step 810 is used to designate a set of N image pairs 820. Each image pair 820 includes a first image and a second image selected from the set of images 800. In some embodiments, each image in the set of images 200 is included in two pairs, one image pair 820 formed with the image captured at the closest viewpoint to the left, and the other image pair 820 formed with the image captured at the closest viewpoint to the right. In this case, the number of image pairs (N) will be equal to the number of images (M) in the set of images 800. Table 2 shows an example of a set of image pairs 820 formed using this strategy for the case where there are 5 input images captured from 5 different viewpoints as in the configuration of FIG. 10.

TABLE 2

| | Set of image pairs. | | | | | |
|---|---|---|---|---|---|---|
| Image | Image | | | | | Transformation |
| Pair | 1 | 2 | 3 | 4 | 5 | Matrix |
| 1 | X | X | | | | $T_{21}$ |
| 2 | | X | X | | | $T_{32}$ |
| 3 | | | X | X | | $T_{43}$ |
| 4 | | | | X | X | $T_{54}$ |
| 5 | X | | | | X | $T_{15}$ |

In some embodiments, additional image pairs 820 can be formed where an image is paired with non-adjacent images;

in this case, the number of image pairs (N) can be larger than the number of images (M). Generally, if the set of images 800 includes M images, there should be at least M−1 image pairs 820 so that each image in the set of images 800 can be related back to a particular image designated as a reference image captured from a reference viewpoint.

A form geometrical transform step 830 is used to determine a geometrical transform 840 for each of the image pairs 820. In a preferred embodiment, the form geometrical transform step 830 uses the same method that was shown in FIG. 2. In particular, a determine corresponding features step 120 is used to determine 2D corresponding features 125 for the first and second images in the image pair 820. Then, a refine corresponding features step 130 is used to determine 3D corresponding features 135, and a determine geometrical transform step 140 is used to determine the geometrical transform 840 for the image pair 820. In the example shown in Table 2, the determined geometrical transforms 840 are shown as a set of transformation matrices $T_{ij}$. The subscripts for the transformation matrices are used to indicate that the geometrical transform is used to transform from the XYZ coordinates for the $i^{th}$ image to determine transformed XYZ coordinates that are consistent with the XYZ coordinates of the $j^{th}$ image. For example, $T_{21}$ can be used to transform from the XYZ coordinates for image #2 to be consistent with the XYZ coordinates for image #1.

Next, a determine 3D model step 850 is used to determine a 3D model 860 responsive to the geometrical transforms 840 and the set of images 800. In a preferred embodiment, one of the images in the set of images 800 is designated to be a reference image, and the geometrical transforms 840 are used to transform the XYZ coordinates for each of the other images to be consistent with the XYZ coordinates for the reference image. There will generally be multiple ways to combine the geometrical transforms 840 to transform the XYZ coordinates. In one embodiment, the XYZ coordinates are transformed by sequentially transforming the viewpoint in a leftward direction to reach the viewpoint of the reference image. The XYZ coordinates can then be sequentially transformed in a rightward direction to reach the viewpoint of the reference image to determine a second estimate of the transformed XYZ coordinates. The two estimates are then averaged to determine a transformed set of XYZ coordinates. Mathematically, this can be represented using the following set of equations:

$$I_{2T} = \tfrac{1}{2}(T_{21} + T_{15}^{-1} \cdot T_{54}^{-1} \cdot T_{43}^{-1} \cdot T_{32}^{-1}) \cdot I_2 \quad (10a)$$

$$I_{3T} = \tfrac{1}{2}(T_{21} \cdot T_{32} + T_{15}^{-1} \cdot T_{54}^{-1} \cdot T_{43}^{-1}) \cdot I_3 \quad (10b)$$

$$I_{4T} = \tfrac{1}{2}(T_{21} \cdot T_{32} \cdot T_{43} + T_{15}^{-1} \cdot T_{54}^{-1}) \cdot I_4 \quad (10c)$$

$$I_{5T} = \tfrac{1}{2}(T_{21} \cdot T_{32} \cdot T_{43} \cdot T_{54} + T_{15}^{-1}) \cdot I_5 \quad (10d)$$

where $I_2$, $I_3$, $I_4$ and $I_5$ are the original XYZ coordinates, and $I_{2T}$, $I_{3T}$, $I_{4T}$ and $I_{5T}$ are the transformed XYZ coordinates for image #2, image #3, image #4 and image #5, respectively.

In other embodiments, different strategies can be employed to determine the transformed XYZ coordinates. For example, they can be determined by taking the shortest route to reach the viewpoint of the reference image rather than by averaging the transformed XYZ coordinates determined using multiple routes. In this case, the transformed XYZ coordinates for image #2 ($I_{2T}$) would be determined by simply applying the transformation matrix $T_{21}$ to the XYZ coordinates for image #2 ($I_2$).

In some embodiments, the XYZ coordinates for each of the images in the set of images 800 can be transformed to a designated reference viewpoint that does not correspond to the viewpoint for any of the images. In this case, a transformation matrix can be determined to transform the XYZ coordinates for the reference image to XYZ coordinates relative to the designated reference viewpoint. This transformation matrix can then be used to transform from the XYZ coordinates for the reference image to the XYZ coordinates relative to the designated reference viewpoint.

Once the XYZ coordinates for each of the images in the set of images 800 have been transformed to be consistent with the XYZ coordinates of the reference image captured from the reference viewpoint, the sets of XYZ coordinates can be combined in various ways to form the 3D model 860 as was discussed above relative to the determine 3D model step 150 in FIG. 2. As was described earlier, the resulting 3D model 860 can take various forms such as a point cloud 3D model or a triangulated 3D model. Once the 3D model 860 is formed, it can be stored in a processor accessible memory for use in various applications.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

| PARTS LIST | |
|---|---|
| 10 | data processing system |
| 20 | peripheral system |
| 30 | user interface system |
| 40 | data storage system |
| 100 | receive first image step |
| 102 | first image |
| 104 | first 2D image |
| 106 | first range map |
| 110 | receive first image step |
| 112 | second image |
| 114 | second 2D image |
| 116 | second range map |
| 120 | determine corresponding features step |
| 125 | 2D corresponding features |
| 130 | refine corresponding features step |
| 135 | 3D corresponding features |
| 140 | determine geometrical transform step |
| 145 | geometrical transform |
| 150 | determine 3D model step |
| 155 | 3D model |
| 300 | object |
| 310 | first viewpoint |
| 320 | second viewpoint |
| 402 | first image |
| 404 | first 2D image |
| 406 | first range map |
| 412 | second image |
| 414 | second 2D image |
| 416 | second range map |
| 500 | corresponding features |
| 510 | extraneous corresponding features |
| 700 | calculate initial geometrical transform step |
| 705 | initial geometrical transform |
| 710 | transform first image step |
| 715 | transformed first image |

-continued

PARTS LIST

| | |
|---|---|
| 720 | convergence test |
| 725 | update geometrical transform step |
| 730 | updated geometrical transform |
| 750 | point cloud 3D model |
| 760 | triangulated 3D model |
| 765 | inset |
| 800 | set of images |
| 810 | designate image pairs step |
| 820 | image pair |
| 830 | form geometrical transform step |
| 840 | geometrical transform |
| 850 | determine 3D model step |
| 860 | 3D model |
| 910 | viewpoint |
| 920 | viewpoint |
| 930 | viewpoint |
| 940 | viewpoint |
| 950 | viewpoint |

The invention claimed is:

1. A method for determining a three-dimensional model from three or more images, the method implemented at least in part by a data processing system and comprising the steps of:
   a) receiving three or more images, each image being captured from a different viewpoint and including a two-dimensional image together with a corresponding range map;
   b) designating a plurality of pairs of received images, each pair including a first image and a second image;
   c) for each of the designated pairs of received images:
      i) identifying a set of corresponding features in the two-dimensional images for the first and second digital images;
      ii) removing any extraneous corresponding features in the set of corresponding features responsive to the range maps for the first and second images to produce a refined set of corresponding features;
      iii) determining a geometrical transformation for transforming three-dimensional coordinates for the first image to three-dimensional coordinates for the second image responsive to three-dimensional coordinates for the refined set of corresponding features, the three-dimensional coordinates comprising two-dimensional pixel coordinates from the corresponding two-dimensional image together with a depth coordinate from the corresponding range map;
   d) determining a three-dimensional model responsive to the three or more received images and the geometrical transformations for the designated pairs of received images; and
   e) storing the three-dimensional model in a processor-accessible memory system.

2. The method of claim 1 wherein the corresponding features are identified using a SIFT algorithm or a SURF algorithm.

3. The method of claim 1 wherein corresponding features are identified for corner points or edge points in the two-dimensional images for the first and second images.

4. The method of claim 1 wherein the two-dimensional images for the first and second images are color images, and wherein the step of identifying the set of corresponding features includes evaluating spatial and color features in the two-dimensional images for the first and second images.

5. The method of claim 4 wherein the surface topologies in neighborhoods around the corresponding features are compared, and wherein corresponding features having surface topologies that differ by more than a specified threshold are identified as extraneous corresponding features.

6. The method of claim 1 wherein the geometrical transformation includes a transformation matrix.

7. The method of claim 6 wherein the transformation matrix performs rotation, translation and scaling for a set of three-dimensional coordinates.

8. The method of claim 6 wherein the transformation matrix is determined by:
   determining an initial transformation matrix by applying a least squares fitting algorithm to the three-dimensional coordinates for the refined set of corresponding features;
   using the initial transformation matrix to transform three-dimensional coordinates for the first image forming transformed three-dimensional coordinates for the first image; and
   refining the transformation matrix responsive to differences between the transformed three-dimensional coordinates for the first image and the three-dimensional coordinates for the second image.

9. The method of claim 8 wherein the transformation matrix is refined using an iterative closest points algorithm.

10. The method of claim 1 wherein the three-dimensional model is determined by:
    using the transformation matrixes to transform three-dimensional coordinates for each of the received images to a common viewpoint forming a set of transformed images; and
    combining the transformed images to form the three-dimensional model.

11. The method of claim 10 wherein the set of transformed images are combined by forming a combined point cloud including points from each of the transformed images.

12. The method of claim 10 wherein the set of transformed images are combined to form a triangulated mesh of surface points.

13. A system comprising:
    a data processing system; and
    a memory system communicatively connected to the data processing system and storing instructions configured to cause the data processing system to implement a method for determining a three-dimensional model from three or more images, wherein the instructions comprise:
    a) receiving three or more images, each image being captured from a different viewpoint and including a two-dimensional image together with a corresponding range map;
    b) designating a plurality of pairs of received images, each pair including a first image and a second image;
    c) for each of the designated pairs of received images:
       i) identifying a set of corresponding features in the two-dimensional images for the first and second digital images;
       ii) removing any extraneous corresponding features in the set of corresponding features responsive to the range maps for the first and second images to produce a refined set of corresponding features;
       iii) determining a geometrical transformation for transforming three-dimensional coordinates for the first image to three-dimensional coordinates for the second image responsive to three-dimensional coordinates for the refined set of corresponding features, the three-dimensional coordinates comprising two-dimensional pixel coordinates from the corresponding two-dimensional image together with a depth coordinate from the corresponding range map;

d) determining a three-dimensional model responsive to the three or more received images and the geometrical transformations for the designated pairs of received images; and
e) storing the three-dimensional model in a processor-accessible memory system.

14. A computer program product embodied on a non-transitory tangible computer readable storage medium for determining a three-dimensional model from three or more images comprising an executable software application for causing a data processing system to perform the steps of:
  a) receiving three or more images, each image being captured from a different viewpoint and including a two-dimensional image together with a corresponding range map;
  b) designating a plurality of pairs of received images, each pair including a first image and a second image;
  c) for each of the designated pairs of received images:
    i) identifying a set of corresponding features in the two-dimensional images for the first and second digital images;
    ii) removing any extraneous corresponding features in the set of corresponding features responsive to the range maps for the first and second images to produce a refined set of corresponding features;
    iii) determining a geometrical transformation for transforming three-dimensional coordinates for the first image to three-dimensional coordinates for the second image responsive to three-dimensional coordinates for the refined set of corresponding features, the three-dimensional coordinates comprising two-dimensional pixel coordinates from the corresponding two-dimensional image together with a depth coordinate from the corresponding range map;
  d) determining a three-dimensional model responsive to the three or more received images and the geometrical transformations for the designated pairs of received images; and
  e) storing the three-dimensional model in a processor-accessible memory system.

* * * * *